United States Patent [19]
Kawam et al.

[11] Patent Number: 5,510,598
[45] Date of Patent: Apr. 23, 1996

[54] ELECTRO-THERMALLY ACTUATED SWITCH

[75] Inventors: Elias A. Kawam, Lawrenceville, N.J.; Terri A. Cardellino, Newtown, Pa.

[73] Assignee: Martin Marietta Corporation, East Windsor, N.J.

[21] Appl. No.: 397,739

[22] Filed: Mar. 3, 1995

Related U.S. Application Data

[63] Continuation of Ser. No. 25,508, Mar. 3, 1993, abandoned.

[51] Int. Cl.⁶ ........................................................ H05B 1/02
[52] U.S. Cl. .......................... 219/505; 219/511; 219/491; 337/123; 337/141
[58] Field of Search ................................. 219/210, 511, 219/512, 491, 497, 499, 501, 505, 508, 509; 337/77, 78, 123, 141

[56] References Cited

U.S. PATENT DOCUMENTS

| | | | |
|---|---|---|---|
| 3,308,271 | 3/1967 | Hilbiber | 219/210 |
| 3,393,870 | 7/1968 | Jeffrey | 219/210 |
| 3,846,679 | 11/1974 | Jost et al. | 219/212 |
| 3,858,141 | 12/1974 | Lackey | 337/140 |
| 4,382,176 | 5/1983 | Wood | 219/494 |
| 4,412,872 | 11/1983 | Albrecht et al. | 148/11.5 F |
| 4,413,174 | 11/1983 | Ting | 219/511 |
| 4,617,448 | 10/1986 | Goldowsky | 219/200 |
| 4,633,061 | 12/1986 | Arikawa | 219/202 |
| 4,753,465 | 6/1988 | Dalby | 292/32 |
| 4,884,780 | 12/1989 | Ohashi | 251/11 |
| 5,039,843 | 8/1991 | Muller | 219/511 |

FOREIGN PATENT DOCUMENTS

| | | |
|---|---|---|
| 0373544 | 6/1990 | European Pat. Off. . |
| 2232245 | 12/1990 | United Kingdom . |

OTHER PUBLICATIONS

Institut National De La Propriete Industrielle, "Notification D'Un Rapport De Recherche Preliminaire," dated 23 Jan. 1995.

*Primary Examiner*—Mark H. Paschall
*Attorney, Agent, or Firm*—Clement A. Berard, Jr.

[57] ABSTRACT

A thermally-actuated switch includes a pair of switch contacts openable or closeable in response to a change in the length of a shape memory metal (SMM) rod. The SMM rod is caused to change its length by having its temperature increased by heat produced when electrical power dissipated in a heating element that is coupled in electrical circuit with the switch contacts. To this end, the heating element is thermally coupled to the SMM rod, such as by a common heatsink. Where the switch is to be openable, the heating element is preferably in series circuit with the contacts, and where the contacts are closeable, the heating element is preferably in parallel therewith.

17 Claims, 2 Drawing Sheets

ELECTRO-THERMALLY ACTUATED SWITCH

This application is a continuation of Ser. No. 08/025,508, filed Mar. 3, 1993, now abandoned.

The present invention relates to electrical switches, and, in particular, to such switches responsive to electrical current.

When batteries having a plurality of series-connected cells are employed in locations where maintenance and repair are difficult or impossible, there is the possibility that the degradation or failure of a single battery cell will permanently render the entire battery useless. This is so even where the system utilizing the battery is designed to function with one or more of the battery's cells failed. Of most concern is a high resistance or open circuit condition of a cell.

Conventional solutions to enable continued functioning with a high resistance or open circuit cell are unsatisfactory in many applications. One solution is to connect diodes in parallel with each cell: firstly, an appropriate number of series-connected diodes poled to conduct charge current, and, secondly, an appropriate number of parallelly-connected diodes poled to conduct discharge current. The weight of these diodes and the heat sinks necessary to remove the heat from the power that any one or more of them may dissipate is often excessive. An alternative is to connect a commandable relay across each cell, however this relay is excessively heavy and requires complex sensing and activation circuitry, although it generates less heat.

What is needed is a switch that is lightweight and does not dissipate high power when it is conducting battery current. Accordingly the present invention comprises a pair of electrical contacts moveable between open circuit and closed circuit positions and a thermally conductive base having a cavity therein. A shape memory metal member located in said cavity changes in dimension upon reaching a predetermined temperature and engages said pair of electrical contacts. An electrical heating means is closely thermally coupled to said base for heating said member to said predetermined temperature. Said electrical heating means is coupled in electrical circuit with at least one of said pair of electrical contacts.

IN THE DRAWING

Figure 1:
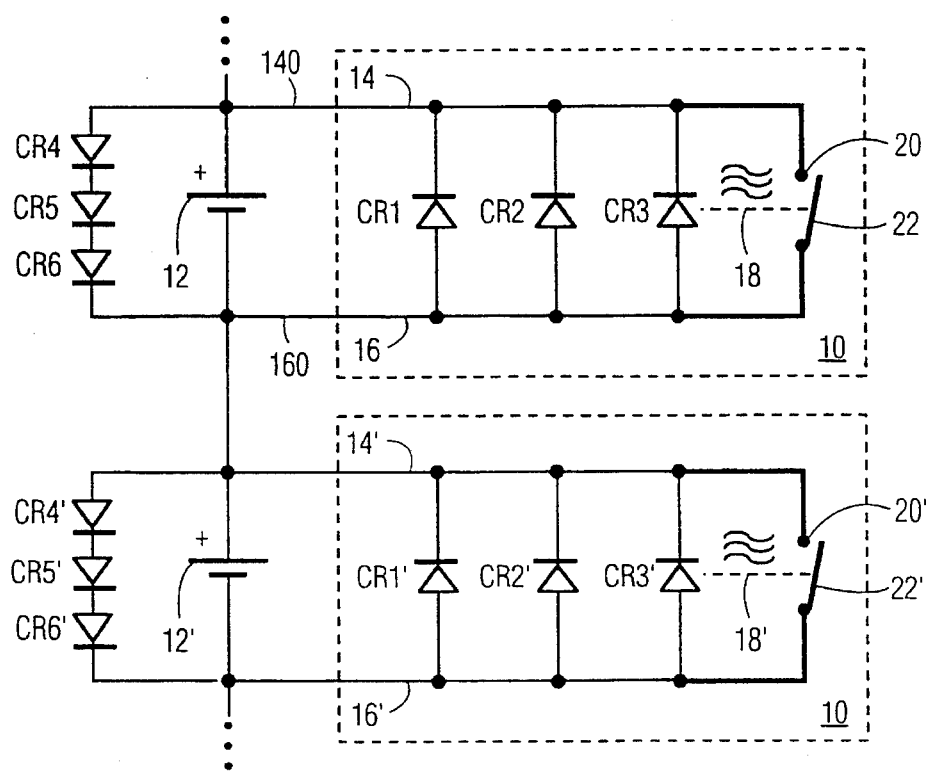
FIG. 1 is an electrical schematic diagram relating to the invention.

In FIG. 1, a battery includes a plurality of battery cells connected in series of which battery cells 12 and 12' are shown. Normally, charge and discharge currents for the battery flow through each battery cell, i.e., each cell completes the series circuit for all the other cells. If one of the cells were to degrade or fail in a manner as to exhibit a significant resistance or become an open circuit, then the entire battery would be rendered useless even though the other battery cells remained operative. To avoid this condition, a diode CR1 can be connected in parallel with the battery cell with its cathode connected to the positive terminal of the cell for conducting the current that flows in the battery when it is discharging. In practice, a number of diodes, CR1, CR2 and CR3, are often connected in parallel to increase the current carrying capacity or to provide protection against failure of any one of them.

In similar fashion, a conduction path for the current that flows in the battery when it is being charged can be provided by one or more diodes CR4, CR5 and CR6 connected in series, and then connected with their anodes towards the positive terminal of each battery cell. The number of diodes is selected so that negligible current flows through the series-connected diodes when a normal battery cell is being charged. For nickel-cadmium and nickel-hydrogen battery cells, for example, three series-connected diodes in parallel with each battery cell is satisfactory. For a 32-cell 100 ampere-hour capacity battery, the charge-current carrying diodes and heat sinks required to safely remove the heat from the power dissipated therein would weigh about 8 to 10 pounds.

Thermally actuated switch 10 of FIG. 1 includes three parallel diodes CR1, CR2 and CR3 connected in parallel with battery cell 12, with their respective cathode terminals coupled via connections 14 and 140 to the positive terminal of cell 12 and their respective anode terminals coupled via connections 16 and 160 to the negative terminal of cell 12, for conducting battery discharge current if cell 12 fails or exhibits unusually high resistance. A pair of switch contacts 20, 22 are also connected in parallel with battery cell 12. A thermal actuator 18 (represented schematically by a dashed line with three wavy lines) responsive to the heat generated by the discharge current flowing in diodes CR1, CR2 and CR3 engages electrical contacts 20, 22 for closing the circuit between them when actuated. The elements of FIG. 1 identified by primed designations relate to battery cell 12' in like manner to the way the elements identified by unprimed designations relate to battery cell 12.

Figure 2:
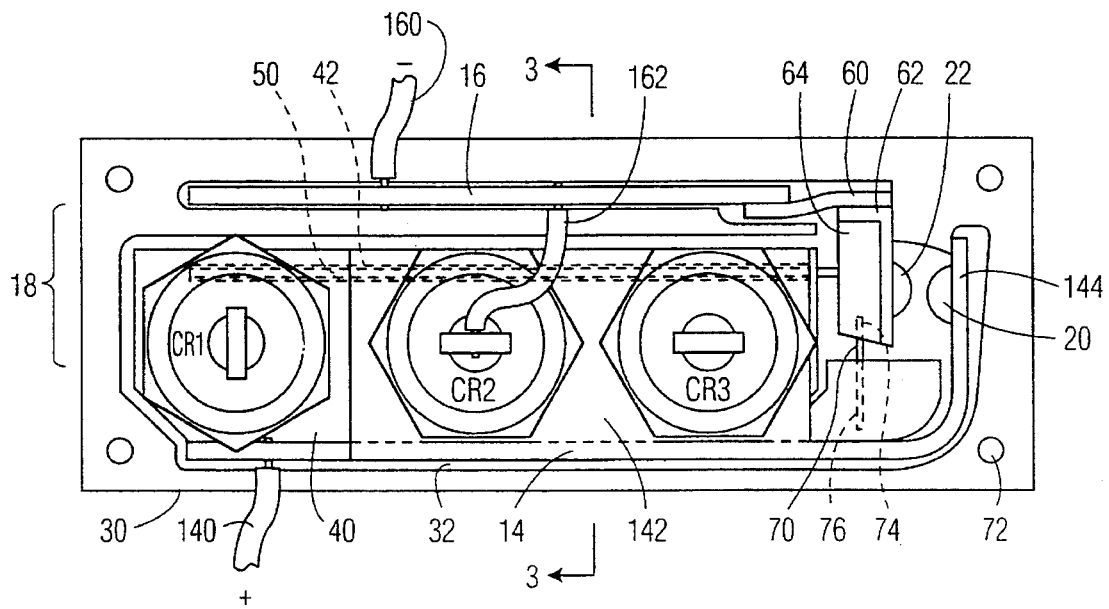
FIGS. 2 and 3 are diagrams of a view and a section of apparatus including an embodiment of the present invention.

In the exemplary embodiment of FIG. 2, the thermally actuated switch 10 is arranged within a cavity 32 in a mounting base 30. Base 30 may be constructed of a convenient insulating material such as G-10 fiberglass epoxy or a composite or plastic, such as a polyetherimide, and may include one or more mounting holes 72. Thermal actuator 18 is arranged in cavity 32 as follows. A thermally conductive base 40 serves as a mounting base for an electrical heating element, here diodes CR1, CR2 and CR3, which are in close thermal contact therewith. Base 40, which can be fabricated of copper or aluminum or other material having a high thermal conductivity, includes provision for mounting diodes CR1, CR2 and. CR3. These diodes may be in a package having a threaded mounting stud which can be secured through a hole in base 40 by a threaded nut or can be installed into a threaded hole in base 40.

Within thermally conductive base 40 is a cavity 42 in which a member 50 fabricated of a shape memory metal (SMM) alloy resides.

Several alloys are known to exhibit shape memory properties. The particular shape memory metal alloy employed in the arrangements described herein is a nickel titanium alloy (NiTi or NiTiNOL). NiTiNOL is a Nickel Titanium shape memory alloy believed to have been developed, in the early 1960's, at the Naval Ordnance Lab. SMM materials are available from Shape Memory Applications located in Sunnyvale, California and from Furukawa Electric located in Tokyo, Japan. Shape memory alloys exhibit the property of "remembering" a preset or "stored" shape, even after the material is deformed or compressed into a different shape. The shape memory recovery is induced by the application of heat and is triggered at a preset temperature that is determined by the particular alloy composition and is selected to suit the particular application of the SMM element. Transformation temperatures between −100° C. and +100° C. are possible. The rate at which the recovery can occur is limited by how fast heat can be applied.

For an application with a one-time actuation, NiTiNOL can recover up to an 8% memory strain (δL/L) without significant residual strain. For applications involving a few cycles (for example, <10), a 5% memory strain is a reasonable design guideline, and for multiple cycle applications (up to 10 million), a 3% memory strain is a reasonable design guideline. To compare these strain values with typical engineering alloys, consider the following: A specimen of a typical steel alloy (ASTM-386) would begin yielding for strains greater than 0.12%. For a 100° C. temperature change, a specimen of a typical steel alloy would elongate by about 0.12% of its length.

The process utilized to "store" or preset a shape in a NiTiNOL SMM element is outlined below.

Step 1. Obtain the initial form of a SMM element, for example, a piece of straight rod or tube of predetermined length that is the desired stored shape (i.e. the shape to which it is desired that the element return when heated in use).

Step 2. Clamp the element to prevent distortion or motion during heat treatment.

Step 3. Heat treat (anneal) the clamped element in an oven at a temperature well above its transformation temperature, typically at 400° C. to 500° C. for up to one hour, in an inert atmosphere.

Step 4. Cool the clamped element back to a temperature, e.g., room temperature, which is below its transformation temperature.

Step 5. Form the element into the desired shape by plastically deforming it, for example, compress it to decrease its length.

Thereafter, when the plastically deformed element is heated to a temperature above its transformation temperature it will return to its undeformed state, i.e., the stored shape.

This process can be repeated many times on the same element without significant degradation. The "stored" shape need not be the same each time, however, the material will only "remember" the last "stored" shape; the previous shape is lost in the annealing process. NiTiNOL is also available with cryogenic transformation temperatures, and the above process will differ with respect to the temperatures employed.

When an SMM element is employed in apparatus such as that described herein, which may be required to be operated only a few times, it is satisfactory to repeat only step 5 of the process between actuations.

Specifically, in the exemplary embodiment of FIG. 2, cavity 42 in thermally conductive base 40 is a bore hole and SMM member 50 is a 0.10 inch diameter SMM rod having an uncompressed length of 2.14 inches. Prior to installation, the rod is compressed to a length of 2.0 inches. The SMM alloy is one that will return to its uncompressed length at a predetermined temperature of about 60 degrees Centigrade (°C.). The end of SMM rod 50 to the left in FIG. 2 rests on and is thus constrained to press against the bottom of bore 42 and the other end of rod 50 engages electrical contact 22 as will be described below.

Positive terminal 14 of switch 10 is formed by connection member 14 having a flat portion 142 that extends under the cathodes of diodes CR2 and CR3 and is electrically and mechanically connected to base 40 by the clamping effect of their cathodes and mounting studs. Member 14 can also be coupled to base 40 by screws or soldering or other conventional methods. The arrangement as shown maintains the desired high thermal conductivity between diodes CR2 and CR3 and thermally conductive base 40 so that the diodes remain closely coupled thermally to the SMM rod 50.

Connection terminal 14 in FIG. 2 includes an extended portion 144 onto which electrical contact 20 is electrically and mechanically mounted, such as by swaging or soldering, for example. At the other end of terminal 14 are provided holes into which one or more connecting wires 140 may be connected, such as by soldering.

Negative terminal 16 resides in cavity 32 of mounting base 30 and includes a plurality of holes into which connecting wires may be connected, such as one or more connecting wires 160 and connecting wire 162 to the anode terminal of diode CR2 may be connected, such as by soldering. Connecting wires (not shown) between terminal 16 and the anode terminals of CR1 and CR3 are similar to that for CR2. Terminal 16 is connected to electrical contact 22 through a flexible member 60 so that contact 22 is moveable relative to contact 20 for making and breaking electrical contact therebetween.

Electrical contact 22 is electrically and mechanically mounted, such as by swaging or soldering, for example, to an electrically conductive element 62 that is affixed to an insulating member 64. Insulating member 64 insulates the contact 22 and element 62, which are electrically coupled via flexible member 60 to negative terminal 16, from the SMM rod 50, which is electrically coupled via base 40 to positive terminal 14. Contact 22, member 62 and insulator 64 together may be referred to as a contact assembly. Insulator 64 may be made of any convenient insulating material, such as G-10 fiberglass epoxy; nylon, plastic or polyesterimide. Flexible member 60 may be constructed of a spring material, such as beryllium copper, or a copper braid, and connected electrically and mechanically to terminal 16 and element 62 by solder or an electrically conductive adhesive or other convenient method. Contact assembly 22, 62, 64 is maintained in the unactuated (electrically open circuited) position shown in FIG. 2 by a shear pin 70 which engages recesses 74 and 76 in insulator 64 and base 30, respectively.

Contacts 20 and 22 are preferably fabricated of copper or aluminum and have at least their contact areas coated with a material Such as plated tin, gold or silver to protect against oxidation and other contamination that may degrade the quality of the connection made when the contacts close. Terminals 14 and 16 are constructed of a material such as copper or aluminum having a high electrical conductivity and may be plated or coated, such as With tin, silver or gold, to resist corrosion.

Figure 3:
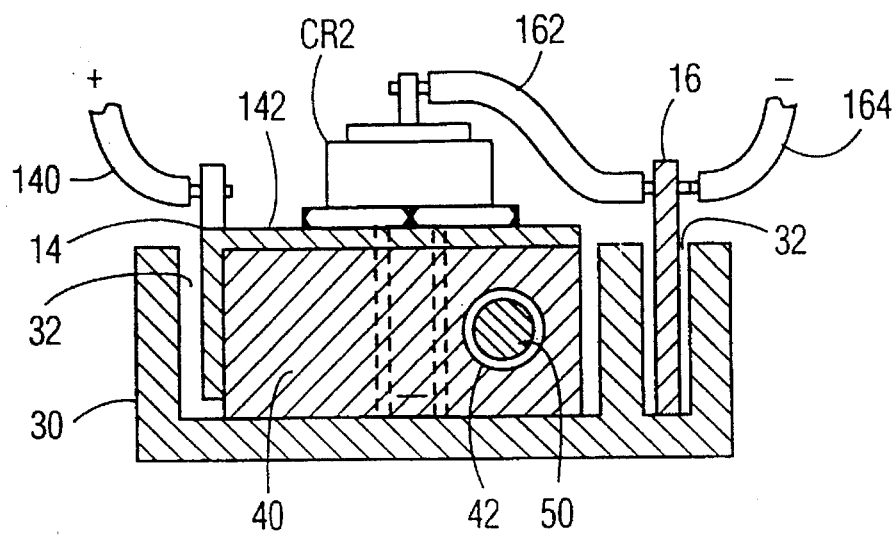

FIG. 3 is a sectional view of the embodiment of FIG. 2 in which elements described above in relation to FIG. 2 that are also shown in FIG. 3 are identified by the same designations. FIG. 3 shows the arrangement of thermally conductive base 40 and negative terminal 16 in the cavity 32 of mounting base 30. Base 32 and terminal 16 may be secured therein by adhesive bonding or by screws or another convenient method, as is known to those of skill in the art. FIG. 3 illustrates the close thermal contact between diode CR2 and thermally conductive base 40 (through the portion 142 of terminal 14) and to the SMM rod 50 located within bore 42 of base 40.

The operation of the thermally actuated switch 10 is as follows. In the unactuated state, SMM rod 50 is in a compressed state and contact assembly 22, 62, 64 is held in place by shear pin 70 thereby maintaining about a 0.020 inch gap between contacts 20 and 22. When electrical current flows through diodes CR1, CR2 and CR3, such as would be caused by an open circuit condition of battery cell 12, the electrical power dissipated in these diodes produces heat. This heat is coupled into base 40 and raises the temperature thereof in accordance with the level of current flowing in diodes CR1, CR2 and CR3. SMM rod 50, being surrounded by the elevated temperature of base 40, is heated thereby until it reaches a predetermined temperature of about 60° C. At this temperature the memory metal alloy returns to its uncompressed length, i.e., it elongates from 2.00 inches to about 2.10–2.14 inches. Because the end of rod 50 within bore 42 is constrained by the bottom of the bore, the elongation of rod 50 engages and applies pressure against contact assembly 22, 62, 64 sufficient to shear the shear pin 70 and cause said contact assembly to move rightward about 0.10 inch. This motion, being greater than the spacing between contacts 20 and 22, causes contacts 20 and 22 to close thereby completing a low resistance circuit between terminals 14 and 16. Because the motion of contact 22 is substantially greater than the spacing between contacts 20 and 22 prior to actuation, contact 20 and extension 144 of terminal 14 are moved to the right into a portion 34 of cavity 32 provided for such purpose. As a result thereof and the springiness of extension 144, contacts 20 and 22 are held tightly together, thereby providing a secure low resistance contact.

In an exemplary embodiment of the apparatus above described, switch 10 is about 3.5 inches long, 1.8 inches wide and 1.0 inch thick. SMM rod 50 is 0.10 inch in diameter and is 2.14 inches long in its uncompressed state, and resides in bore 42 which has a diameter of 0.11 inch. Prior to installation, rod 50 is compressed to 2.00 inches and upon reaching its activation temperature of about 60° C., it elongates with a force of about 200 pounds. Shear pin 70 is a 0.020 inch diameter aluminum rod that requires shears at about 40 pounds force. Terminals 14 and 16, and member 62 are 0.050 thick copper with tin plating. Contacts 20 and 22 are each a gold-plated copper hemisphere of about 0.20 inch diameter. Diodes CR1, CR2 and CR3 are type SD-51 Schottky-barrier power diodes available from Motorola Semiconductor Products located in Phoenix, Ariz. At a current of 50 amperes, these diodes dissipate about 23 watts and generate sufficient heat to cause rod 50 to reach its activation temperature of about 60° C. in 2–3 minutes.

Figure 4:
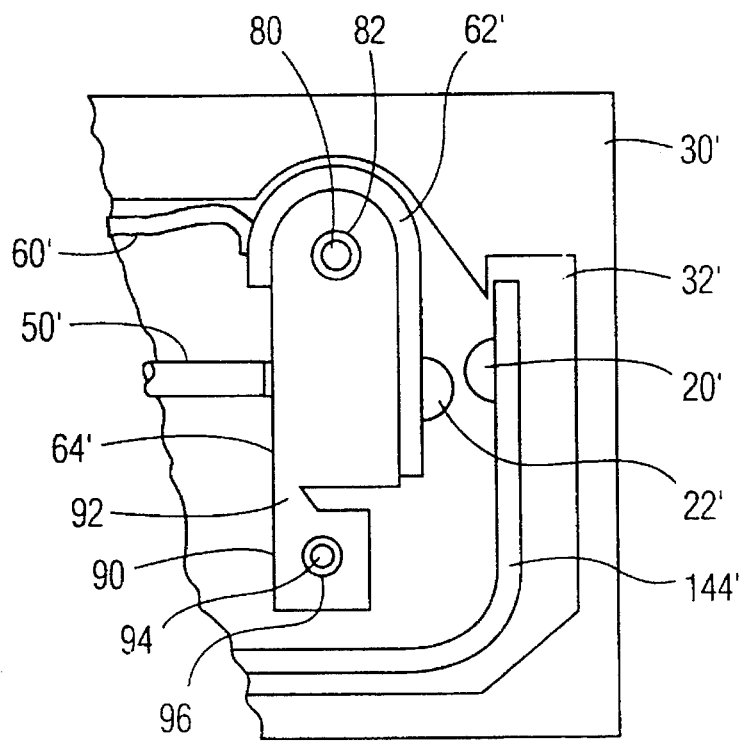
FIG. 4 is a diagram of an alternative arrangement of the embodiment of FIG. 2.

In FIG. 4, which shows an alternative arrangement to that of FIG. 2 for the movable contact assembly including contact 22, elements corresponding to those of FIG. 2 are identified by the same designations with a prime added. Insulating member 64' includes pivot hole 82 and is pivotably mounted within cavity 32' of mounting base 30' by pivot pin 80 within pivot hole 82. Insulating member 64' includes shear tab 90 which is joined thereto via narrowed portion 92. It is preferred that insulating member 64' shear tab 90' and narrowed portion 92' be a single part which may be fabricated by machining, molding or other convenient method. Securing pin 94 passes through securing hole 96 in tab 90 and into base 30' to hold the contact assembly comprising insulating member 64' conductive element 62' and contact 22' in the open circuit position as shown. Insulating member 64' and conductive element 62' may engage each other at respective curved portions as shown or with other complementary shapes.

In operation, the elongation of SMM rod 50' urges said contact assembly rightward for making contact 22 move toward contact 20 but is initially restrained by securing pin 94 in hole 96 of shear tab 90. Narrowed portion 92 thereof, which has a thickness and a width selected to break under a fraction of the force exerted by SMM rod 50', for example, between 10% and 50% thereof. When narrowed portion 92 breaks under the force of rod 50, insulating member 64' is freed to and does rotate about pivot pin 80 whereby contact 22 moves into electrical contact with contact 20' on portion 144' of terminal 14, as previously described in relation to FIG. 2, thereby completing a low resistance electrical circuit between terminals 14 and 16.

Other embodiments of the present invention will become evident to one of ordinary skill in the art in the light of the foregoing description and the scope of the present invention is limited only by the claims following. For example, the electrical heating means herein described as diodes CR1, CR2 and CR3 may be either a greater or lesser number of diodes or an electrical resistance heater. Alternatively, diodes such as CR1, CR2 and CR3 may be mounted in a hybrid package which is mounted to base 40, such as by bonding, or chip diodes may be directly mounted to base 40. Further, the threaded studs of one or more of diodes CR1, CR2 and CR3 may pass through clearance holes in portion 142 of terminal 14 and base 40 and may be secured into threaded holes in base 30.

SMM rod 50 may be shorter than that illustrated herein and may engage a contact, such as moveable contact 22, other than as shown herein. For example, insulator 64 might be eliminated where contact 22 is normally in electrical contact with terminal 14 or whatever terminal, if any is in electrical contact with base 40. Alternatively, an extension of rod 50, such as a cylindrical insulating rod, may be employed for rod 50 engaging contact 22 or the like. Further, SMM element 50 need not be a rod but could, for example, be an element bent into an "L" or "U" shape that straightens when actuated for making contacts 20, 22 to close.

The actuation time may be increased or decreased by adjusting the thermal characteristics of various features of the invention. For example, increasing the diameter of bore 42 will tend to extend the time whereas decreasing the diameter or filling the bore with a thermally conductive grease will tend to shorten the time. Similarly, by increasing or decreasing the loss of heat from the switch assembly 10 to the surrounding environment, such as by surrounding it with insulating material, the actuation time can be increased of decreased. Alternatively, if conventional silicon diodes are substituted for Schottky-barrier diodes for CR1, CR2 and CR3, their higher forward voltage of about 0.75 to 0.85 volts in conduction will produce substantially higher dissipation than with the 0.4 to 0.5 volt conduction voltage of the Schottky-barrier diodes.

What is claimed is:

1. A switch comprising:

a pair of electrical contacts moveable between open circuit and closed circuit positions;

a thermally conductive base having a cavity therein;

a shape memory metal alloy member disposed in said cavity and thermally coupled to said base, said alloy member having first and second locations thereon between which a change in dimension occurs upon said alloy member reaching a predetermined temperature, said first location engaging said base within said cavity and said second location engaging said pair of electrical contacts;

an electrical heating means for producing heat in response to the flow of electrical current therethrough, said heating means being closely thermally coupled to said base for heating said base and said alloy member to said predetermined temperature; and means for coupling said electrical heating means in electrical circuit with at least one of the contacts of said pair of electrical contacts for altering the flow of electrical current in said heating means responsive to said pair of contacts changing between their open and closed circuit positions.

2. The switch of claim 1 wherein said heating means comprises at least one diode having anode and cathode connections.

3. The switch of claim 2 wherein one of said base and said diode has a threaded hole therein, and a threaded element associated with the other of said base and said diode engages the threaded hole for closely thermally coupling said base and said diode.

4. The switch of claim 2 wherein said means for coupling includes the anode connection of said diode coupled to a first contact of said pair of contacts and the cathode connection thereof coupled to the other contact of said pair.

5. The switch of claim 1 wherein the cavity in said base includes a bore and said shape memory metal member alloy includes a rod in said bore.

6. The switch of claim 5 wherein said rod extends in length when its temperature is increased to said predetermined temperature.

7. The switch of claim 1 further comprising a battery cell having positive and a negative polarity terminals, said positive and negative polarity terminals each being connected to a respective contact of said pair of contacts.

8. Switch apparatus having first and second terminals comprising:

a mounting base having a cavity adapted for receiving first and second contacts and a heat conducting member;

first and second electrical contacts in said cavity, the first being moveable in relation to the second for changing between open circuit and closed circuit positions;

a heat conducting member in said cavity and having a bore therein;

an elongated shape memory metal alloy member located in said bore and thermally coupled to said heat conducting member, said elongated shape memory metal alloy member having first and second ends between which a change in length occurs upon said elongated shape memory metal alloy member reaching a predetermined temperature, said first end being within said bore and engaging said heat conducting member therein, and said second end extending from said bore for engaging said first electrical contact;

an electrical heating means for producing heat in response to the flow of electrical current therethrough, said heating means being closely thermally coupled to said heat conducting member for heating said heat conducting member and said elongated shape memory metal alloy member to said predetermined temperature;

means for coupling said electrical heating means in electrical circuit with at least one,of said first and second electrical contacts for altering the flow of electrical current in said heating means responsive to Said electrical contacts changing between their open and closed circuit positions; and means for coupling said first electrical contact to said first terminal and said second electrical contact to said second terminal.

9. The switch apparatus of claim 8 wherein said heating means comprises at least one diode having anode and cathode connections.

10. The switch apparatus of claim 9 wherein one of said heat conducting member and said diode has a threaded hole therein, and a threaded element associated with the other of said heat conducting member and said diode engages the threaded hole for closely thermally coupling said heat conducting member and said diode.

11. The switch apparatus of claim 9 wherein said means for coupling includes the anode connection of said diode coupled to one of Said first and second contacts and the cathode connection thereof coupled to the other of said first and second contacts.

12. The switch apparatus of claim 8 wherein said elongated shape memory metal member alloy is a rod.

13. The switch apparatus of claim 8 wherein said elongated shape memory metal member alloy increases in length when its temperature is increased to said predetermined temperature.

14. The switch apparatus of claim 8 further comprising a battery cell having positive and a negative polarity terminals, said positive and negative polarity terminals each being connected to a respective one of said first and second contacts.

15. Apparatus comprising:

a battery having positive and negative terminals;

at least one diode having anode and cathode connections;

first and second electrical contacts moveable between open circuit and closed circuit positions;

means for coupling said positive terminal to the cathode of said diode and to said first electrical contact;

means for coupling said negative terminal to the anode of said diode and to said second electrical contact;

a shape memory metal alloy member having first and second locations thereon between which a change in dimension occurs upon said alloy member reaching a predetermined temperature, said first location being constrained and said second location engaging one of said first and second electrical contacts;

means for closely thermally coupling said diode to said shape memory metal alloy member for heating said alloy member to said predetermined temperature when electrical current flows through said diode, wherein the resulting change in dimension causes said first and second electrical contacts to change from the open circuit to the closed circuit position.

16. The apparatus of claim 15 wherein said means for closely thermally coupling includes a thermally conductive member having a cavity therein for receiving said shape memory metal member alloy, and means for affixing said diode to said thermally conductive member.

17. The apparatus of claim 16 wherein the cavity in said thermally conductive member is a bore, and said shape memory metal member alloy is a rod at least a portion of which is in said bore.

* * * * *

UNITED STATES PATENT AND TRADEMARK OFFICE
CERTIFICATE OF CORRECTION

PATENT NO. : 5,510,598

DATED : April 23, 1996

INVENTOR(S) : Elias A. Kawam and Terri A. Cardellino

It is certified that error appears in the above-identified patent and that said Letters Patent is hereby corrected as shown below:

Column 7, line 2, "member alloy" should be --alloy member--.
Column 8, line 2, "member alloy" should be --alloy member--.
Column 8, line 2, "member alloy" should be --alloy member--.
Column 8, line 4, "member alloy" should be --alloy member--.
Column 8, line 3, "member alloy" should be --alloy member--.

Signed and Sealed this

First Day of October, 1996

Attest:

BRUCE LEHMAN

*Attesting Officer*  *Commissioner of Patents and Trademarks*